(12) United States Patent
Chou

(10) Patent No.: US 9,400,225 B1
(45) Date of Patent: Jul. 26, 2016

(54) PRESSURE GAUGE STRUCTURE

(71) Applicant: Chin Ray Industrial Ltd., Chiayi (TW)

(72) Inventor: Chiu-Sung Chou, Chiayi (TW)

(73) Assignee: Chin Ray Industrial Ltd., Chiayi (TW)

( * ) Notice: Subject to any disclaimer, the term of this patent is extended or adjusted under 35 U.S.C. 154(b) by 0 days.

(21) Appl. No.: 14/810,693

(22) Filed: Jul. 28, 2015

(51) Int. Cl.
*G01D 11/24* (2006.01)
*G01L 19/14* (2006.01)

(52) U.S. Cl.
CPC ..................................... *G01L 19/14* (2013.01)

(58) Field of Classification Search
CPC .............................. G01D 11/24; G01D 11/245
USPC .................................................. 73/431, 146.3
See application file for complete search history.

(56) References Cited

U.S. PATENT DOCUMENTS

| | | | |
|---|---|---|---|
| 5,753,821 A * | 5/1998 | Chou | G01L 7/088 73/715 |
| 6,495,777 B1 * | 12/2002 | Chou | H01H 35/2635 200/83 J |
| 2006/0144135 A1 * | 7/2006 | Chou | G01B 3/28 73/146.3 |

* cited by examiner

Primary Examiner — Lisa Caputo
Assistant Examiner — Jamel Williams
(74) Attorney, Agent, or Firm — Alan D. Kamrath; Kamrath IP Lawfirm, P.A.

(57) ABSTRACT

A pressure gauge structure contains: a hollow case, a pushing device, a display unit, and a receiving bag. The hollow casing includes a bow-shaped frame, a support rack disposed below the bow-shaped frame, and a film defined between the bow-shaped frame and the support rack. The pushing device includes an insulation plate and includes a push bolt contacting with a bottom end of the insulation plate and inserting through a screwing post, wherein between the insulation plate and the film is defined a chamber, and the screwing post is screwed with a bottom end of the support rack. The display unit is mounted on the film, and the receiving bag is fixed between the film and the insulation plate to hold fluid with a certain density, the push bolt has a protruded rib extending outward from one end thereof and abuts against the screwing post.

4 Claims, 5 Drawing Sheets

PRESSURE GAUGE STRUCTURE

BACKGROUND OF THE INVENTION

1. Field of the Invention

The present invention relates to a pressure gauge structure, and more particularly to a pressure gauge which avoids a sudden burst and fluid leakage which result from a high pressure in a measuring process.

2. Description of the Prior Art

A conventional pressure gauge structure is applied to measure a pressure value of gas or fluid, thus providing pressure parameters in production process.

As illustrated in FIG. 5, a conventional pressure gauge contains a hollow cylinder 20, a piston unit 30, and a display unit 40. The hollow cylinder 20 includes a hollowly narrow section 201 and a wide section 202, an area of a cross section of which is greater than the hollowly narrow section 201. The hollowly narrow section 201 has an inlet defined away from the wide section 202 and communicating with an unmeasured workpiece, the wide section 202 has a connecting orifice formed away from the hollowly narrow section 201. The piston unit 30 includes a piston 301 movably fixed in the wide section 202 and includes a push rod 302 movably mounted between the wide section 202 and the narrow section 201. The push rod 302 has a pushing segment 3021 downwardly inserted into the hollowly narrow section 201 and has a stopping segment 3022 upwardly extending into the wide section 202 and pushing the piston 301, such that the hollow cylinder 20 forms a first chamber 203 located below the push rod 302 to hold fluid, an insulation chamber 204 located between the hollow narrow section 201 and the piston 301 to hold gas, and a second chamber 205 located above the piston 301 to receive the fluid by ways of the piston 301 and the push rod 302.

However, the piston bursts out of the conventional pressure gauge structure in a high pressure.

The present invention has arisen to mitigate and/or obviate the afore-described disadvantages.

SUMMARY OF THE INVENTION

The primary objective of the present invention is to provide a pressure gauge structure which covers fluid with a certain density in a receiving bag to avoid fluid leakage.

Another objective of the present invention is to provide a pressure gauge structure in which a protruded rib of a push bolt abuts against an inner wall of a screwing post to avoid the push bolt bursting out of the screwing post.

Accordingly, a pressure gauge structure provided by the present invention contains; a hollow case, a pushing device, a display unit, and a receiving bag.

The hollow casing includes a bow-shaped frame, a support rack disposed below the bow-shaped frame, and a film defined between the bow-shaped frame and the support rack.

The pushing device includes an insulation plate and includes a push bolt contacting with a bottom end of the insulation plate and inserting through a screwing post, wherein between the insulation plate and the film is defined a chamber, and the screwing post is screwed with a bottom end of the support rack.

The display unit is mounted on the film, and the receiving bag is fixed between the film and the insulation plate to hold fluid with a certain density, the push bolt has a protruded rib extending outward from one end thereof and abuts against the screwing post.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
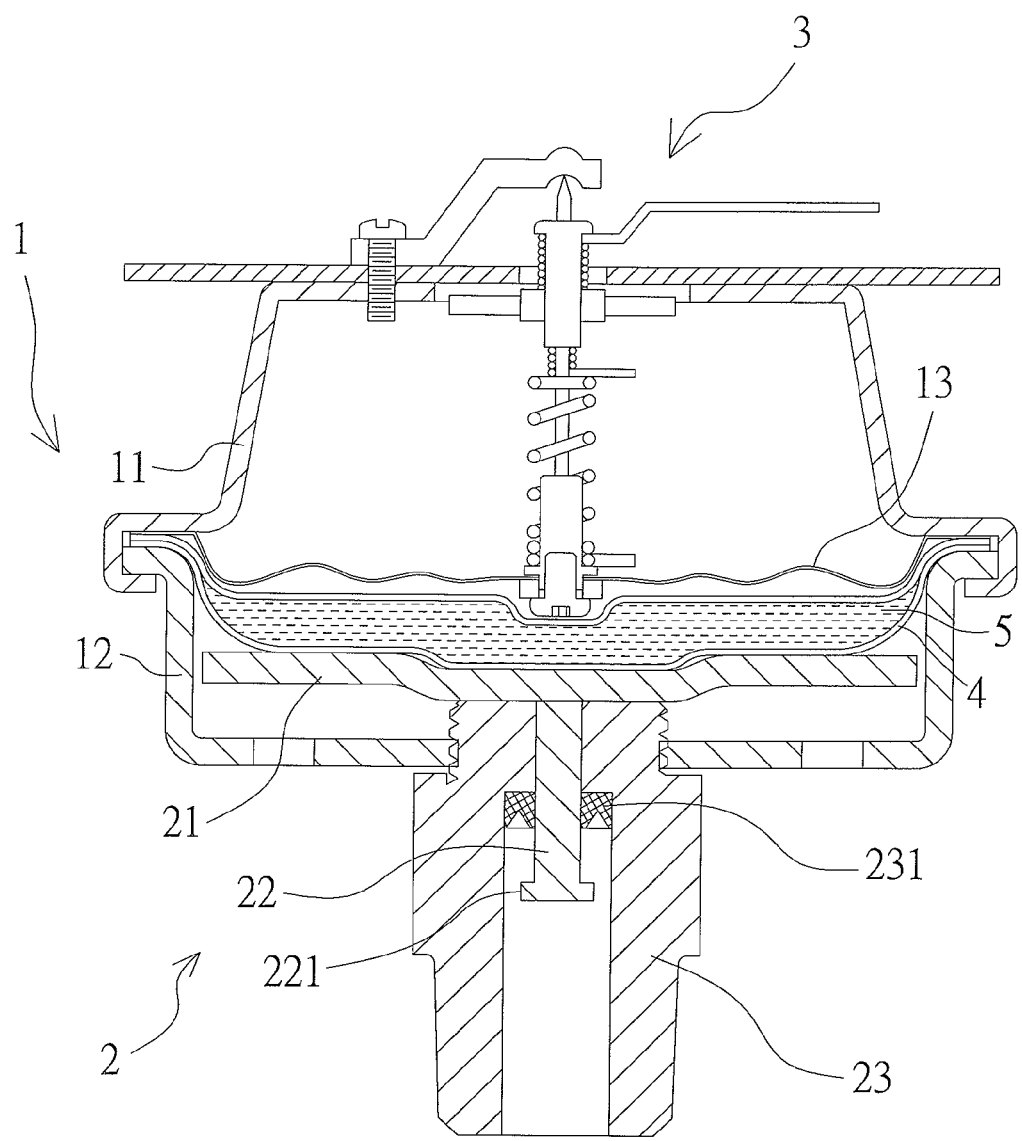
FIG. 1 is a cross sectional view showing the assembly of a pressure gauge structure in accordance with a preferred embodiment of the present invention.

With reference to FIG. 1, a pressure gauge structure according to a preferred embodiment of the present invention comprises:

a hollow casing 1 including a bow-shaped frame 11, a support rack 12 disposed below the bow-shaped frame 11, and a film 13 defined between the bow-shaped frame 11 and the support rack 12;

a pushing device 2 including an insulation plate 21, a push bolt 22 contacting with a bottom end of the insulation plate 21 and inserting through a screwing post 23, wherein between the insulation plate 21 and the film 13 is defined a chamber, and the screwing post 23 is screwed with a bottom end of the support rack 12;

a display unit 3 mounted on the film 13;

characterized in that a receiving bag 4 is fixed between the film 13 and the insulation plate 21 to hold fluid 5 with a certain density, and the push bolt 22 has a protruded rib 221 extending outward from one end thereof and abuts against the screwing post 23.

In this embodiment, the fluid 5 is hydraulic oil.

Between the protruded rib 221 and the screwing post 23 is defined a seal ring 231.

Figure 3:
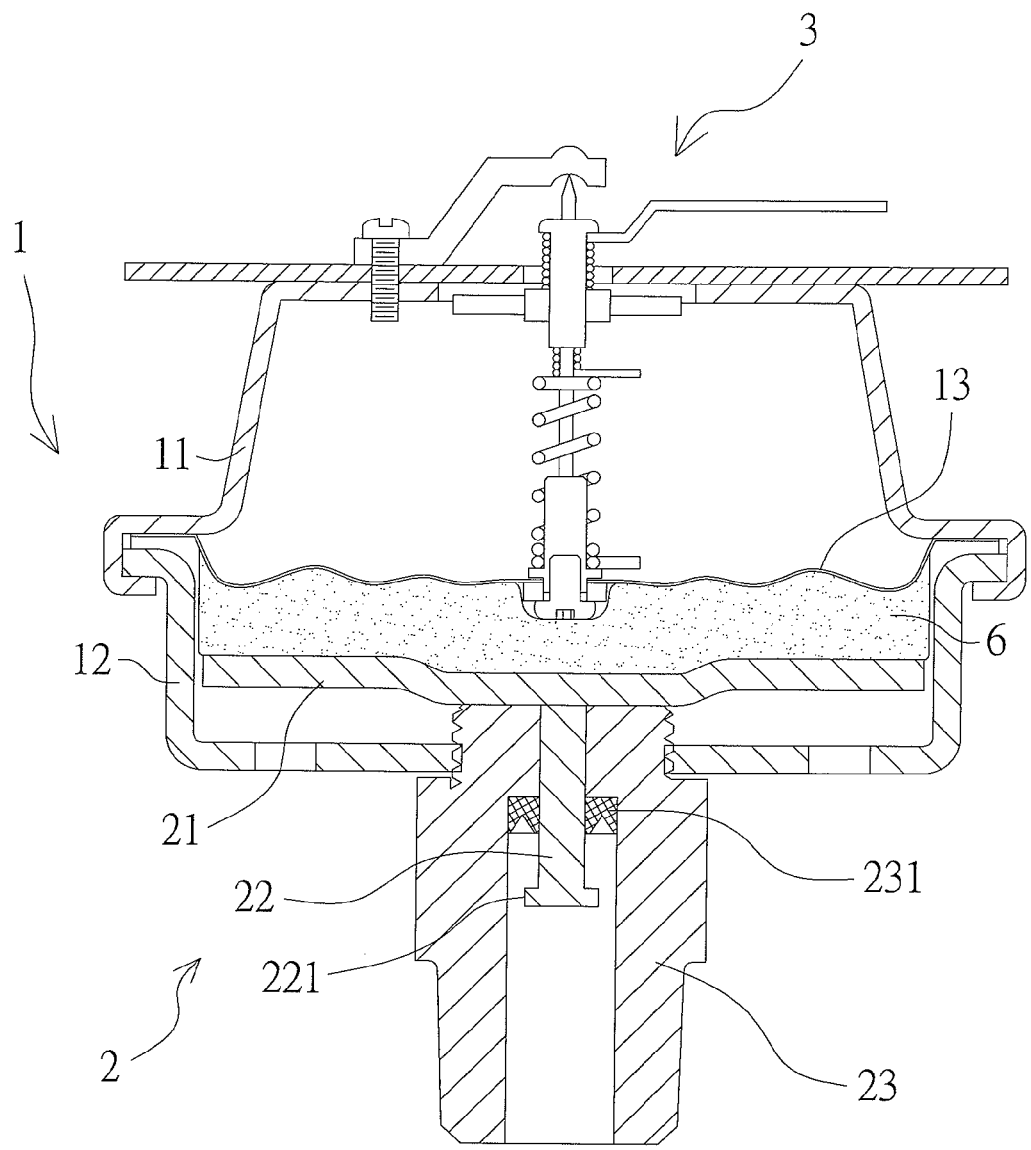
FIG. 3 is a cross sectional view showing the assembly of a pressure gauge structure in accordance with another preferred embodiment of the present invention.

Between the film 13 and the insulation plate 21 is defined a solid substance 6 with a certain density (as shown in FIG. 3).

Figure 2:
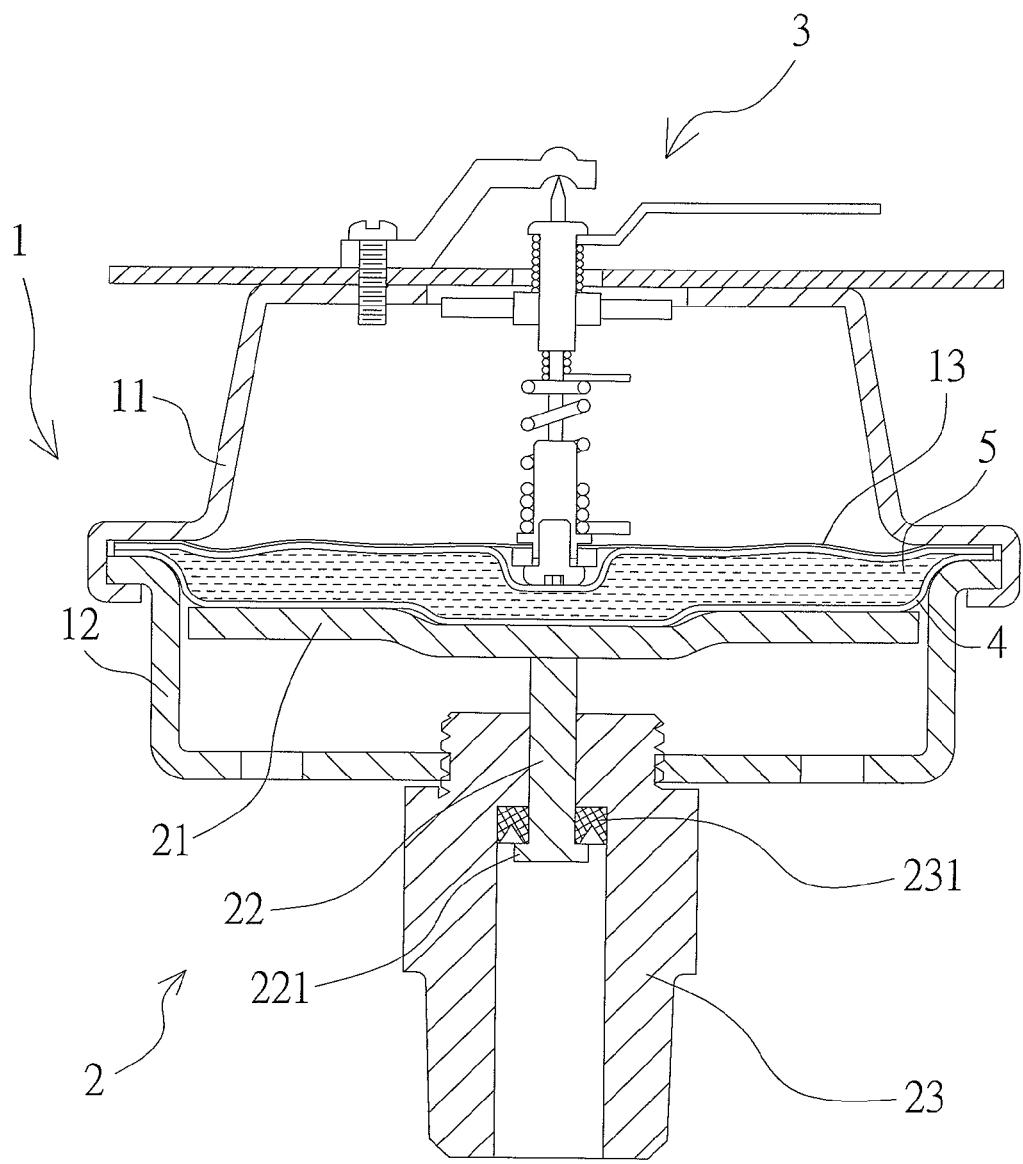
FIG. 2 is a cross sectional showing the operation of the pressure gauge structure in accordance with the preferred embodiment of the present invention.

Referring to FIG. 2, in operation, a pressure source is connected with the screwing post 23 so as to push the push bolt 22 via the screwing post 23, and the push bolt 22 pushes the insulation plate 21, the receiving bag 4 and the fluid 5 in the receiving bag 4 transfer a pressure value to push the film 13, hence the display unit 3 displays a measured pressure based on a Formula: $F=P \times A$ (Since $F=P \times A$ is a well-known formula, further remarks are omitted). When the pressure source is pressurized quickly and enters into the screwing post 23, the push bolt 22 is pushed upward so that its protruded rib 221 abuts against an inner wall of the screwing post 23 to avoid the push bolt 22 suddenly bursting out of the pressure gauge structure, thus preventing a damage of a pressure gauge. Preferably, the fluid 5 between the film 13 and the insulation plate 21 is protected by the receiving bag 4 to avoid a leakage and a measurement error.

The density of the fluid 5 in the receiving bag 4 is changed according to the pressure source to comply with using requirements of various products.

Figure 4:
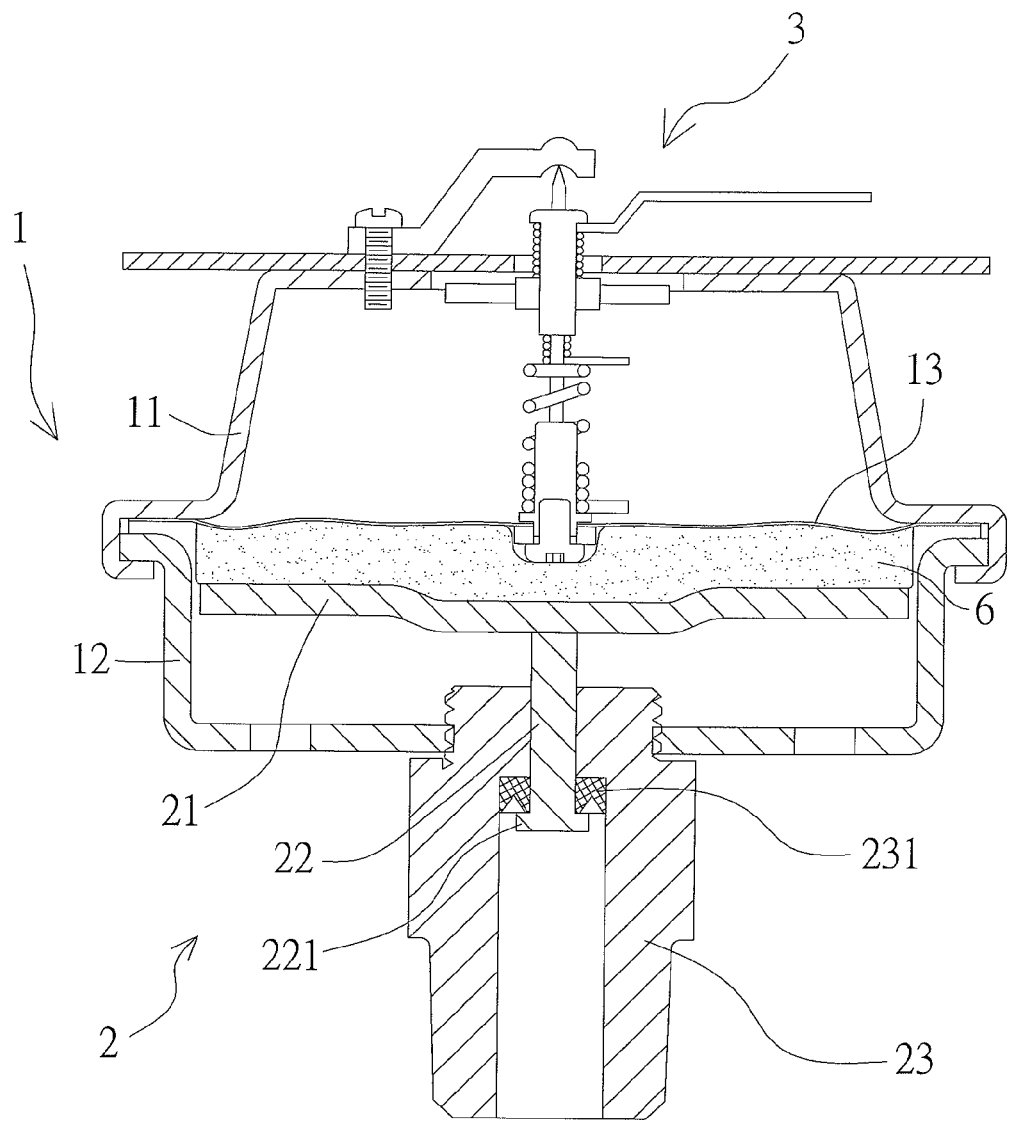
FIG. 4 is a cross sectional view showing the operation of the pressure gauge structure in accordance with another preferred embodiment of the present invention.
Figure 5:
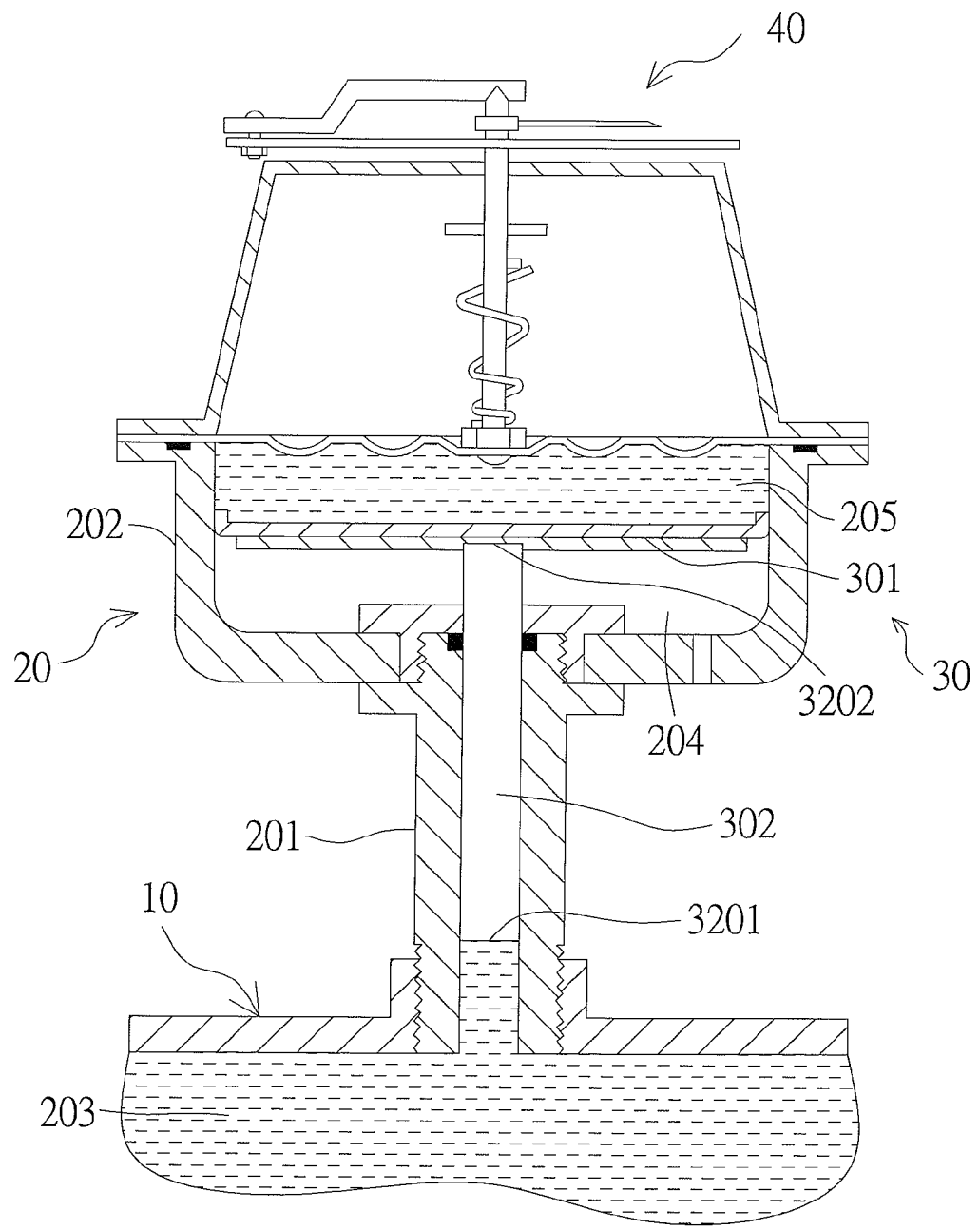
FIG. 5 is a cross sectional view of a conventional pressure gauge.

With reference to FIG. 4, in another preferred embodiment, the receiving bag 4 between the film 13 and the insulation plate 21 and the fluid 5 in the receiving bag 4 are replaced by the solid substance 6 (such as rubber) to avoid fluid leakage and to obtain easy installation.

Thereby, the pressure gauge structure protects the fluid by ways of the receiving bag to avoid the fluid leakage and to achieve easy installation. Also, the protruded rib of the push bolt prevent the push bolt bursting out of the pressure gauge structure to reduce the damage of the pressure gauge structure.

While we have shown and described various embodiments in accordance with the present invention, it is clear to those skilled in the art that further embodiments may be made without departing from the scope of the present invention.

What is claimed is:

1. A pressure gauge structure comprising:

a hollow casing including a bow-shaped frame, a support rack disposed below the bow-shaped frame, and a film defined between the bow-shaped frame and the support rack;

a pushing device including an insulation plate, a push bolt contacting with a bottom end of the insulation plate and inserting through a screwing post, wherein between the insulation plate and the film is defined a chamber, and the screwing post is screwed with a bottom end of the support rack;

a display unit mounted on the film;

characterized in that a receiving bag is fixed between the film and the insulation plate to hold fluid with a certain density, and the push bolt has a protruded rib extending outward from one end thereof and abuts against the screwing post.

2. The pressure gauge structure as claimed in claim 1, wherein the fluid is hydraulic oil.

3. The pressure gauge structure as claimed in claim 1, wherein between the protruded rib and the screwing post is defined a seal ring.

4. The pressure gauge structure as claimed in claim 1, wherein between the film and the insulation plate is defined a solid substance with a certain density.

* * * * *